US012686502B2

(12) United States Patent　(10) Patent No.:　US 12,686,502 B2
Olson et al.　(45) Date of Patent:　Jul. 21, 2026

(54) AIRCRAFT FUEL TANK WITH AN ELECTRICAL BOND SEPARATE FROM A FUEL TANK FASTENER

(71) Applicant: Textron Aviation Inc., Wichita, KS (US)

(72) Inventors: Richard Andrew Olson, Derby, KS (US); Brent Clothier, Wichita, KS (US); Bryan Edwards, Mulvane, KS (US)

(73) Assignee: Textron Innovations Inc., Providence, RI (US)

( * ) Notice: Subject to any disclaimer, the term of this patent is extended or adjusted under 35 U.S.C. 154(b) by 184 days.

(21) Appl. No.: 18/443,848

(22) Filed: Feb. 16, 2024

(65) Prior Publication Data

US 2025/0263176 A1　Aug. 21, 2025

(51) Int. Cl.
B64D 37/32　　(2006.01)
B64D 45/02　　(2006.01)

(52) U.S. Cl.
CPC ............. B64D 37/32 (2013.01); B64D 45/02 (2013.01)

(58) Field of Classification Search
CPC .......... B64D 37/32; B64D 45/02; B64C 1/06; B32B 7/08; B32B 5/02
USPC ........................................................ 361/218
See application file for complete search history.

(56) References Cited

U.S. PATENT DOCUMENTS

| | | | |
|---|---|---|---|
| 3,989,984 A | * 11/1976 | Amason | F16B 33/004 |
| | | | 244/1 A |
| 7,576,966 B2 | 8/2009 | Heeter | |
| 7,599,164 B2 | 10/2009 | Heeter et al. | |
| 7,898,785 B2 | 3/2011 | Winter et al. | |
| 7,936,550 B2 | 5/2011 | Morrill et al. | |
| 7,969,706 B2 | 6/2011 | Heeter et al. | |
| 8,004,815 B2 | 8/2011 | Loche et al. | |
| 8,436,243 B2 | 5/2013 | Gattus et al. | |
| 8,451,577 B2 | 5/2013 | Bessho et al. | |
| 8,587,916 B2 | 11/2013 | Yamakoshi et al. | |
| 8,654,500 B2 | 2/2014 | Satake | |
| 8,882,423 B2 | 11/2014 | Watanabe | |
| 9,108,363 B2 | 8/2015 | Dilligan et al. | |
| 9,163,656 B2 | 10/2015 | Asahara et al. | |
| 9,334,065 B2 | 5/2016 | Bessho et al. | |
| 10,202,203 B2 | 2/2019 | Skibba et al. | |
| 10,524,340 B2 | 12/2019 | Kaste et al. | |
| 10,752,377 B2 | 8/2020 | Wilkerson et al. | |

(Continued)

FOREIGN PATENT DOCUMENTS

| | | |
|---|---|---|
| EP | 2190742 B1 | 2/2013 |
| EP | 2060490 B1 | 3/2014 |

(Continued)

*Primary Examiner* — Danny Nguyen
(74) *Attorney, Agent, or Firm* — Avek IP, LLC

(57)　　　　ABSTRACT

A aircraft fuel tank includes an inner layer having an inner surface and an outer surface; an outer layer having an inner surface and an outer surface, the inner surface of the outer layer and the outer surface of the inner layer aligning at an interface; a fastener extending through the inner layer and the outer layer to hold the inner layer and the outer layer together; and an electrical bond separate from the fastener and conductively coupling the inner layer and the outer layer together; the electrical bond is to provide a pathway for an electrical current to travel separate from the fastener.

19 Claims, 6 Drawing Sheets

(56)  References Cited

U.S. PATENT DOCUMENTS

| | | | | |
|---|---|---|---|---|
| 2010/0213312 | A1 * | 8/2010 | Robb | B64C 1/068 |
| | | | | 244/133 |
| 2011/0247203 | A1 * | 10/2011 | Lopez-Reina | B64D 45/02 |
| | | | | 29/729 |
| 2012/0234977 | A1 * | 9/2012 | Kawahara | B64D 45/02 |
| | | | | 244/131 |
| 2024/0009961 | A1 * | 1/2024 | Thompson | B64D 45/02 |

FOREIGN PATENT DOCUMENTS

| | | | |
|---|---|---|---|
| EP | 2004490 | B1 | 12/2015 |
| EP | 1767344 | B2 | 4/2018 |

* cited by examiner

| Variable | Description |
|---|---|
| Dh | Diameter of fastener hole/Diameter of fastener stem 224 |
| Dsp | Diameter of spot face electrical bond 222 |
| Tp | Thickness of primer 212a-b |
| Tol | Thickness of outer layer 202 |
| Til | Thickness of inner layer 204 |
| Fcf | Force from fastener clamping |

60

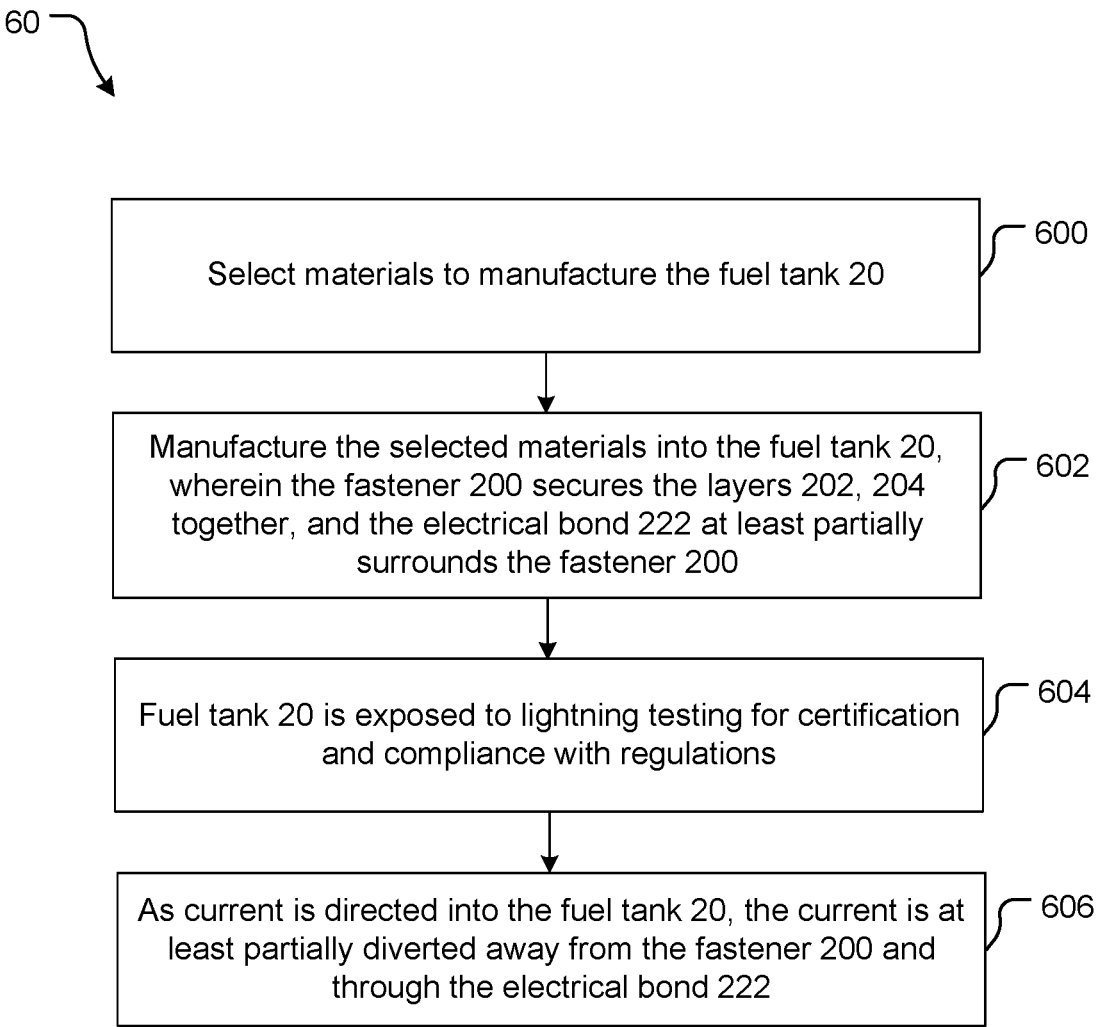

600 — Select materials to manufacture the fuel tank 20

602 — Manufacture the selected materials into the fuel tank 20, wherein the fastener 200 secures the layers 202, 204 together, and the electrical bond 222 at least partially surrounds the fastener 200

604 — Fuel tank 20 is exposed to lightning testing for certification and compliance with regulations 606 — As current is directed into the fuel tank 20, the current is at least partially diverted away from the fastener 200 and through the electrical bond 222

608 — Once the fuel tank 20 is installed into an aircraft, the electrical bond 222 continues to divert electrical current away from the fastener 200 to reduce the risk of electric discharge inside the fuel tank 20

FIG. 6

AIRCRAFT FUEL TANK WITH AN ELECTRICAL BOND SEPARATE FROM A FUEL TANK FASTENER

BACKGROUND

1. Field

Embodiments of the disclosure relate to aircraft fuel tanks, and in particular to an aircraft fuel tank having an electrical bond between two or more layers separate from a fuel tank fastener for diverting electrical current away from the fastener to reduce a risk associated with an electric discharge inside of the fuel tank.

2. Related Art

Aircraft fuel tanks are known in the art and commonly include one or more features to aid in managing an electrical current generated from a lightning strike. For example, U.S. Pat. No. 7,576,966 to Heeter et al. describes a fuel system specifically for aircraft having an electrical bond between a fuel access door and a fuel tank skin for lightning current diversion. U.S. Pat. No. 8,004,815 to Loche et al. describes a system for lightning protection for fuel systems for aircraft, wherein a conductive strip is utilized to divert and carry current. U.S. Pat. No. 7,898,785 to Winter et al. describes a system for lightning protection for a fuel system utilizing a conductive outer layer to direct and dissipate electrical current.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

An embodiment of the present invention relates to an aircraft fuel tank, including an inner layer having an inner surface and an outer surface; an outer layer having an inner surface and an outer surface, the inner surface of the outer layer and the outer surface of the inner layer aligning at an interface; a fastener extending through the inner layer and the outer layer to hold the inner layer and the outer layer together; and an electrical bond separate from the fastener and conductively coupling the inner layer and the outer layer together; wherein the electrical bond is configured to provide a pathway for an electrical current to travel separate from the fastener.

Another embodiment of the present invention relates to a method of diverting current away from a fastener in an aircraft fuel tank, the method including selecting an inner layer, an outer layer, and a fastener for the aircraft fuel tank; connecting the inner layer and the outer layer with the fastener, the fastener extending from an outer surface of the outer layer to an inner surface of the inner layer; creating an electrical bond between the inner layer and the outer layer that is separate from the fastener such that the inner layer and the outer layer are conductively coupled. The electrical bond provides a pathway for the electrical current to travel that is separate from the fastener, thereby diverting at least a portion of the electrical current away from the fastener.

BRIEF DESCRIPTION OF THE DRAWING FIGURES

Embodiments of the invention are described in detail below with reference to the attached drawing figures, wherein:

FIG. 6 is a flowchart of a method of current diversion from the fastener utilizing the spot face electrical bond of FIG. 2.

Figure 1:
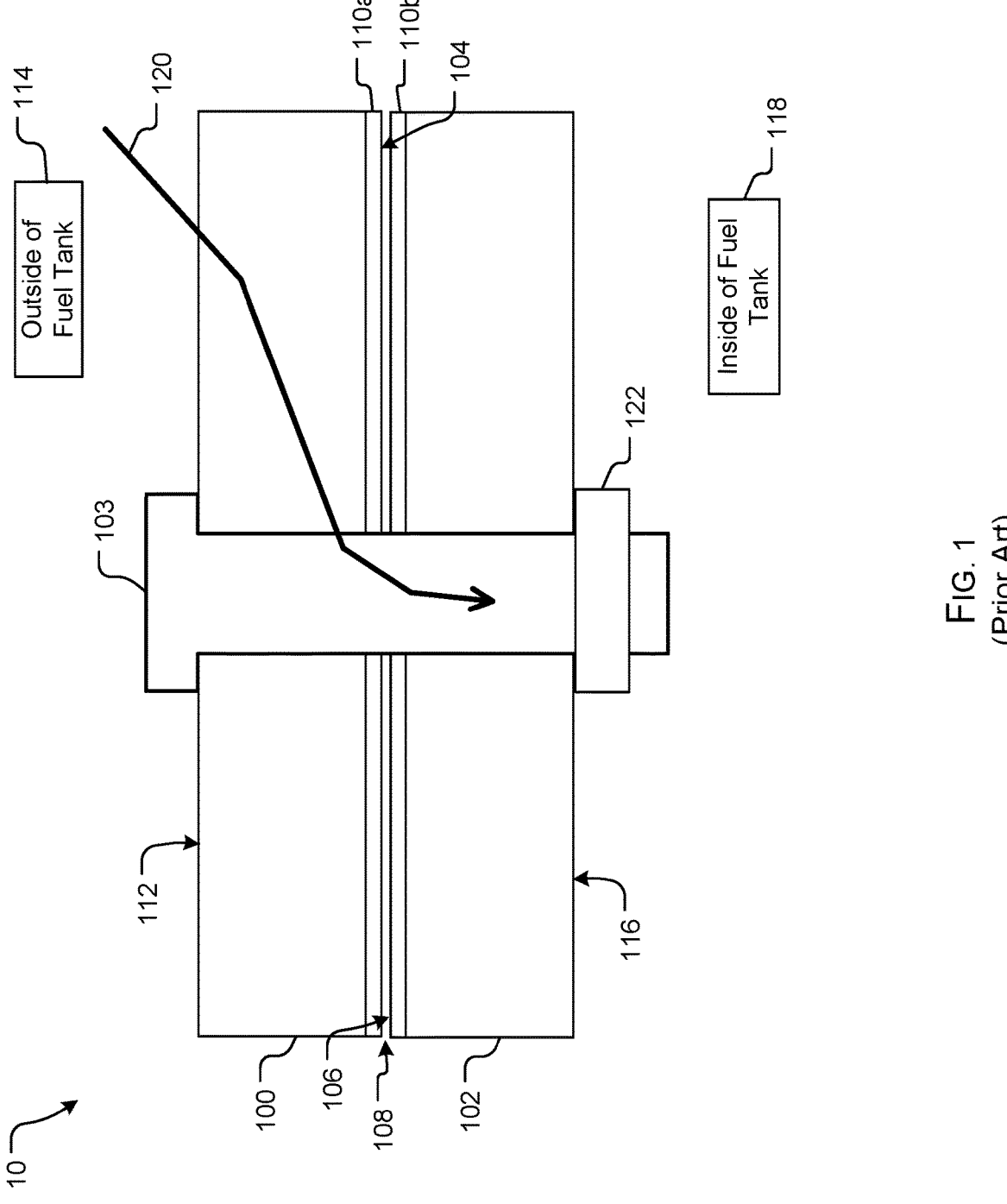
FIG. 1 depicts a side cross-sectional view of a conventional aircraft fuel tank at a location of one fastener.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Aircraft conventionally utilize fuel tanks to transport and store fuel for powering components of the aircraft. Lightning currents in fuel tank fasteners can cause arcing and sparking at the fastener. Aircraft fuel tank systems are subject to compliance and regulatory testing, where lightning testing of fastener interfaces is a substantial portion of said testing. As discussed below, conventionally a metallic fastener secures materials together, leading to an exposed metal head, extending through the structure and into a fuel source, providing a direct, highly conductive path, for an electrical current to travel in the event of a lightning strike.

As shown in FIG. 1, a simplified cross-sectional view depicts a conventional fuel tank 10 for an aircraft. The fuel tank 10 is a structure, having at least an outer layer 100 and an inner layer 102 secured together via a fastener 103. Those skilled in the art will appreciate that the portion of the fuel tank 10 shown in FIG. 1 is a small section taken at one fastener 103, and the entire fuel tank 10 would include a plurality of fasteners. As shown, an inner surface 104 of the outer layer 100 and an outer surface 106 of the inner layer 102 come together at an interface 108 such that the surfaces 104, 106 are pressed together via the fastener 103. In embodiments, these surfaces 104, 106 may also include a layer of primer 110a, 110b to aid in protecting the fuel tank from corrosion.

Fastener(s) 103 are conventionally composed of a metal (e.g. screws or bolts) and extend from an outer surface 112 to an inner surface 116, where the fastener 103 then engages with a fixing part 122, again conventionally composed of metal. Accordingly, the fastener 103 is generally highly conductive and exposed both outside of the fuel tank 114 and inside of the fuel tank 118.

The outer surface 112 of the outer layer 100 is also exposed to the elements outside of the fuel tank 114, while the inner surface 116 of the inner layer 102 is exposed to fuel inside of the fuel tank 118. Accordingly, the outer surface 112 may be exposed to lightning strikes, as well as con-ducted current from a lightning strike elsewhere on the aircraft, resulting in a lightning current 120 traveling through the fuel tank 10. The lightning current 120 will generally condense and flow through the fastener 103 and then into the inside of the fuel tank 118. Current flow into the fuel tank 118 may result in an electric discharge, which could result in ignition of the fuel. Accordingly, fuel tanks are tested to ensure safety standards are met with respect to a potential lightning threat.

To aid in reducing the risk of electric discharge within a fuel tank, the present invention provides for an electrical bond, such as a spot face electrical bond or a washer at least partially surrounding each fastener of the fuel tank, wherein the electrical bond will provide a current flow path away from the fastener to reduce the amount of current that travels through the fastener and into the fuel tank. In other words, a highly conductive flow path that is separate from the fasteners is provided to direct current from an outer layer to an inner layer, thereby reducing current flow directly into the fuel.

Figure 2:
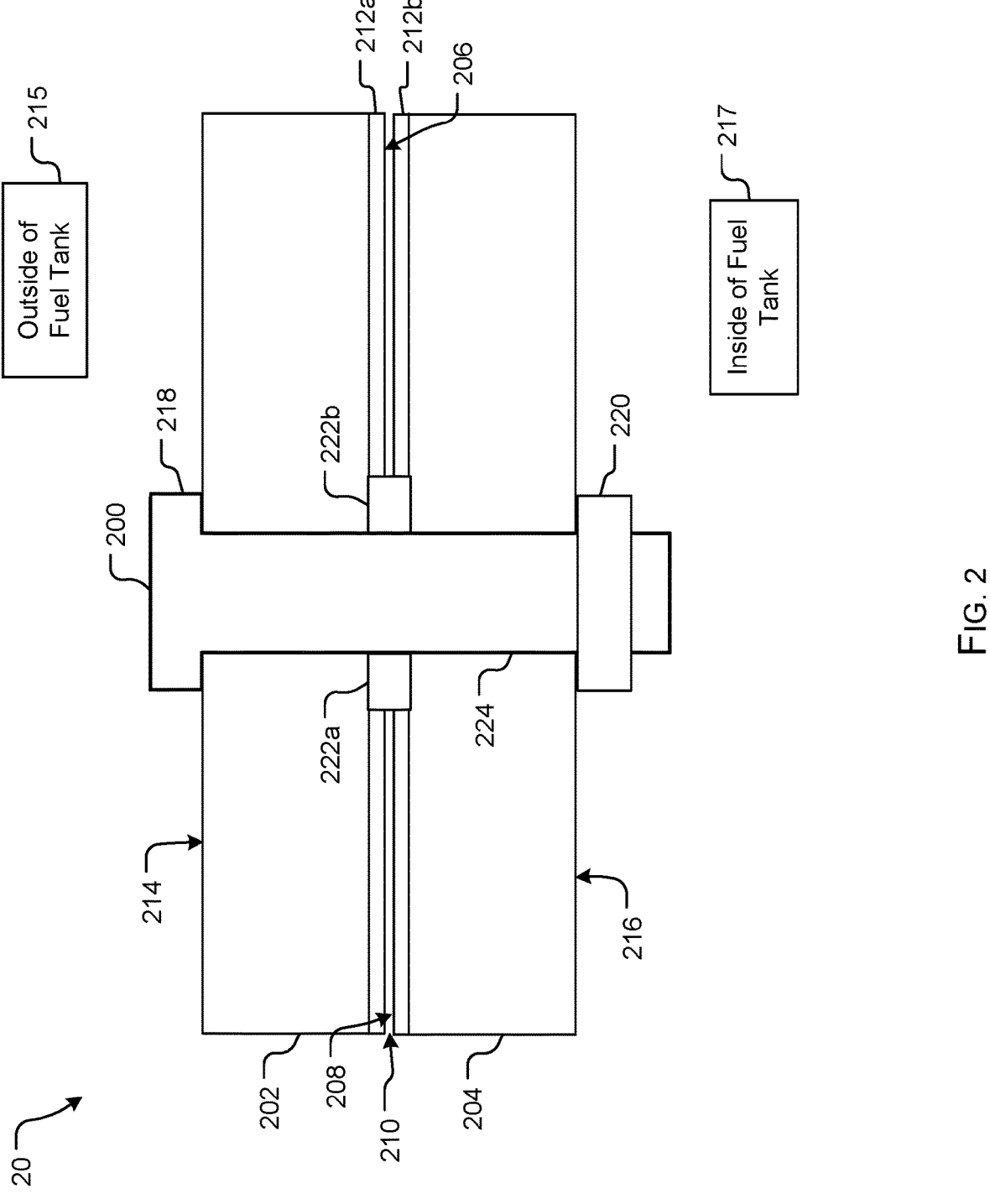
FIG. 2 depicts a side cross-sectional view of an aircraft fuel tank having a spot face electrical bond at a location of one fastener in accordance with the present invention.

In FIG. 2, a cross sectional view of a fuel tank 20 of the present invention is shown. Again, the section of the fuel tank 20 depicts a small area around one fastener 200, however those skilled in the art will appreciate that the fuel tank 20 includes a plurality of fasteners. The fuel tank 20 is a structure with at least an outer layer 202 and an inner layer 204, wherein an inner surface 206 of the outer layer 202 and an outer surface 208 of the inner layer 204 come together at an interface 210. In embodiments, the layers 202, 204 are metal. Some embodiments may include a layer of primer 212a, 212b at the interface 210 to aid in corrosion protection at the surfaces 206, 208. The materials that make up each of the outer layer 202 and the inner layer 204 may vary as would be understood by those skilled in the art, including metals, plastics, or any other suitable materials.

The fastener 200 extends through pre-established holes of both of the outer layer 202 and the inner layer 204, extending from an outer surface 214 exposed to outside of the fuel tank 215 to an inner surface 216 inside of the fuel tank 217. The fastener 200 can again vary as would be understood by those skilled in the art (e.g. bolts, screws, rivets). The fastener 200 will also generally extend from a top head 218 exposed along the outer surface 214 to a fastening element 220 exposed along the inner surface 216. As discussed above, the fastener 200 and fastening element 220 are generally com-posed of a metal, therefore being highly conductive.

Figure 3:
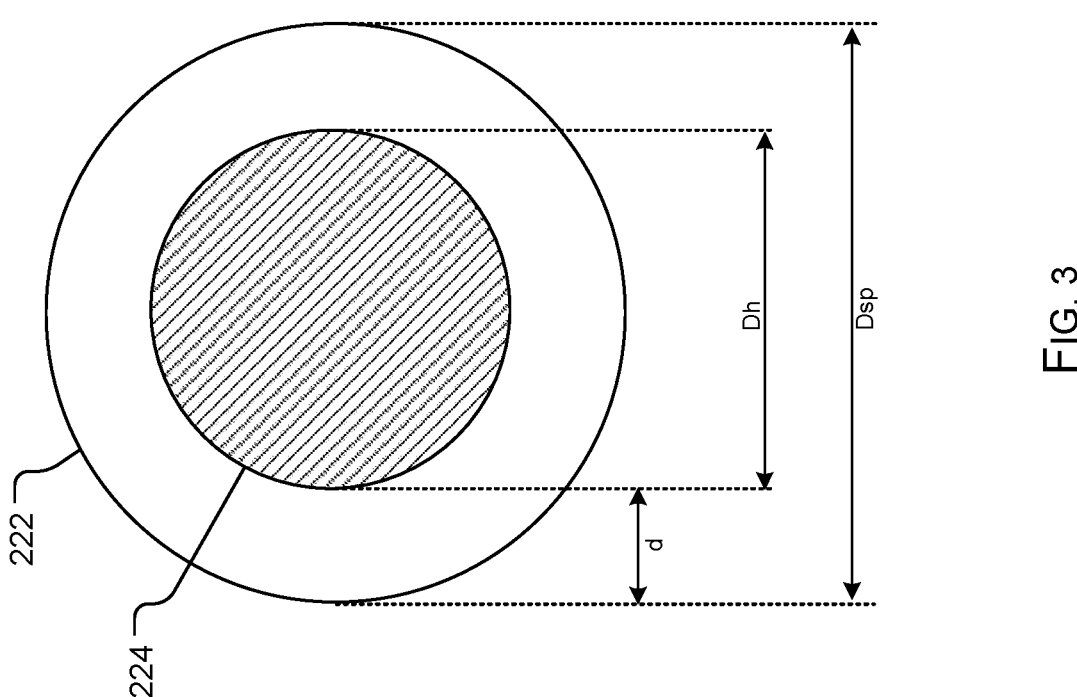
FIG. 3 depicts a top-down cross-sectional view of the spot face electrical bond surrounding a stem of the fastener.

The fuel tank 20 of the present invention further com-prises an electrical bond 222a-b, extending between the outer layer 202 and the inner layer 202, such that a conduc-tive path is formed away from the fastener 200. The elec-trical bond 222a-b may vary in embodiments, for example, in some embodiments, the electrical bond 222a-b is a spot face electrical bond or a direct connection between a metal-lic outer layer 202 and a metallic inner layer 204, such as an area with no primer or barrier between the two layers allows for a conductive path to be formed between the two layers. In other words, as the fastener 200 clamps the two layers together, the layers 202, 204 come into direct contact at electrical bond 222a-b to form the electrical path that is separate from the fastener 200. In other embodiments, a washer forms the electrical bond 222a-b by creating flow-path around the fastener 200. In other words, a washer is selected from conductive material, which in embodiments is aluminum, such that an electrical current will at least par-tially flow through the bond 222a-b (i.e. the washer), as opposed to almost fully through the fastener 200. This configuration aids in dispersing the current, as opposed to the current being concentrated as it flows through the fastener 200. As shown, the electrical bond 222a-b is created adjacent to the fastener and extends at least partially around a stem 224 of the fastener 200. This is best shown in FIG. 3 where the electrical bond 222 surrounds the stem 224 and extends out from the stem 224 a distance (d). The distance (d) being determined by those skilled in the art based on one or more factors associated with the fuel tank 20. Those skilled in the art will appreciate that a larger fastener 200, combined with thinner layers 202, 204, will generally not require a washer to create the electrical bond 222a-b as the layers 202, 204 can be fully clamped together via the fastener 200. Alternatively, in embodiments with a smaller fastener 200 and thicker layers 202, 204, a washer may be needed to create a connection between the layers 202, 204.

Figure 4:
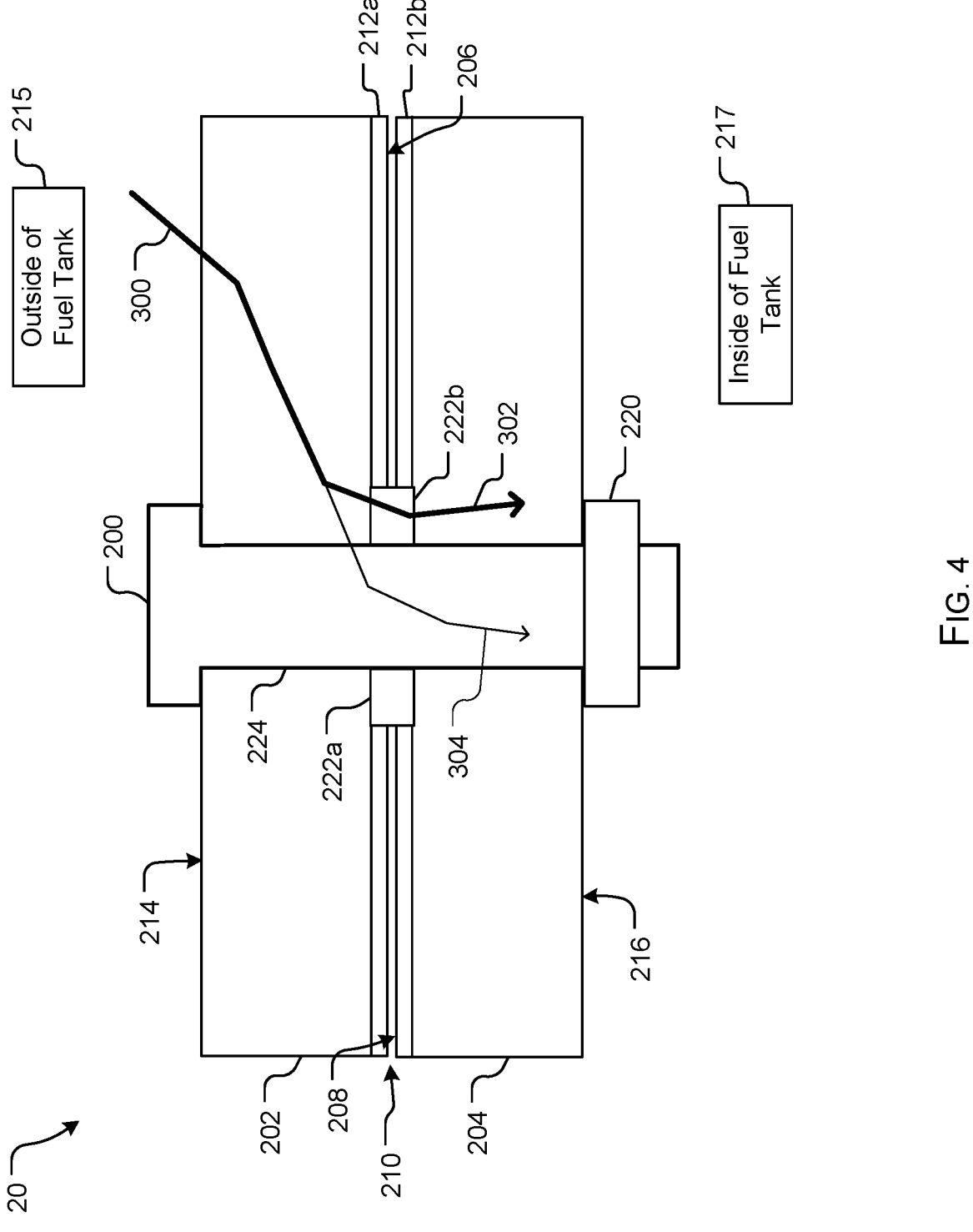
FIG. 4 depicts another side cross-sectional view of the aircraft fuel tank having the spot face electrical bond of FIG. 2 with an electrical current traveling therethrough.

As shown in FIG. 4, if the outer surface 214 is exposed to an electrical current 300, or if electrical current 300 ema-nates from elsewhere in the aircraft, which may be from a lightning strike or generated in testing, an appreciable or substantial amount of the electrical current 302 is likely to travel through the electrical bond 222b to pass between the outer layer 202 and the inner layer 204. A lesser amount of the electrical current 304, or in some cases no electrical current, will travel through the fastener 200 such that an electric discharge inside of the fuel tank 217 is unlikely to occur.

Figure 5:
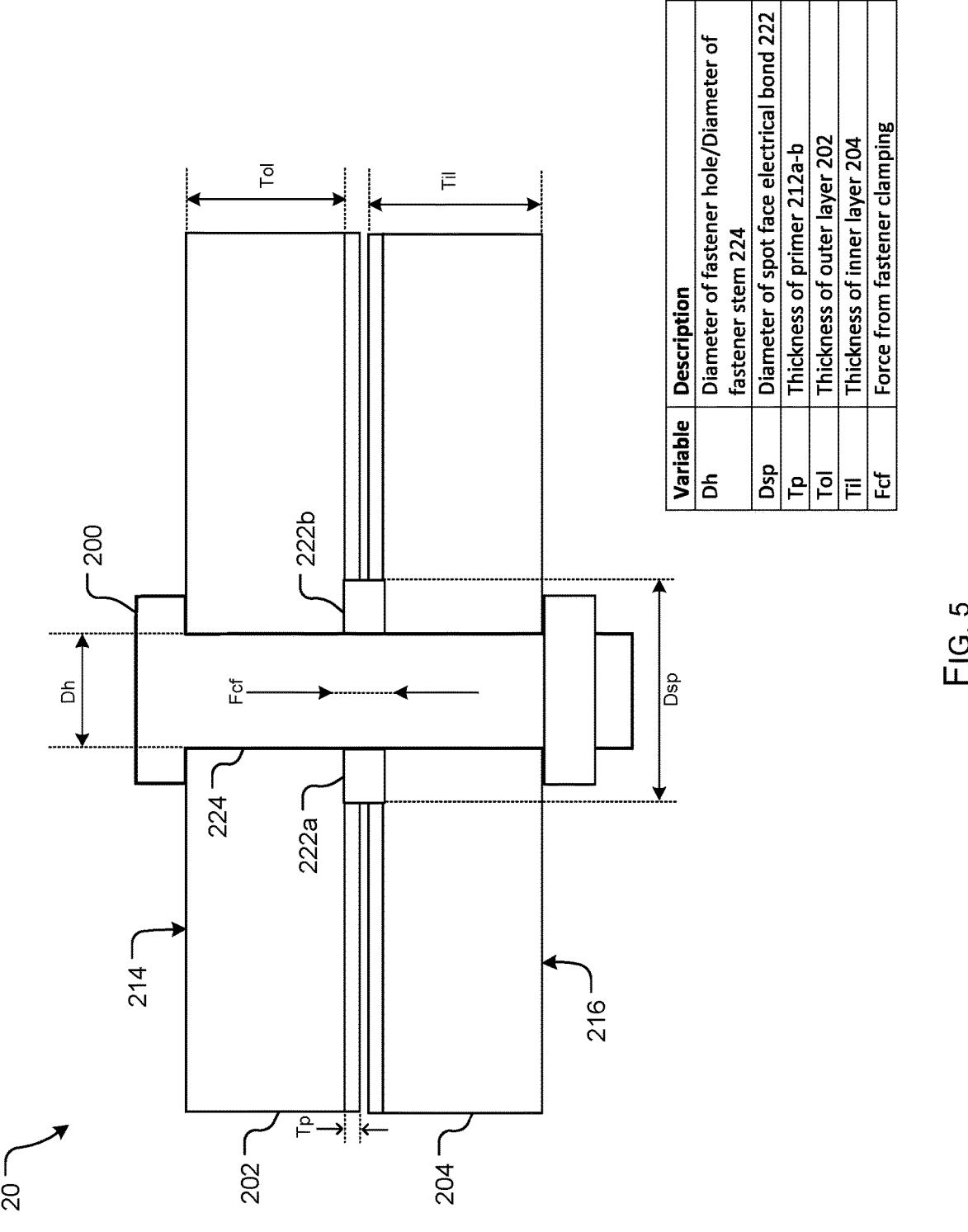
FIG. 5 is another side cross-sectional view of the aircraft fuel tank having the sport face electrical bond of FIG. 2 with a plurality of variables labeled.

As shown in FIG. 5, a plurality of variables is considered to determine an appropriate electrical bond 222a-b (e.g. the need for a washer or not) for a fuel tank 20. First, a diameter of the fastener 200 hole or the diameter of the fastener stem 224 (Dh) is considered to have little to no impact on the relative conductivity of the electrical bond 222. Accordingly, smaller fasteners may be utilized without increasing a risk of electric discharge inside of the fuel tank. The diameter of the spot face electrical bond 222a-b (Dsp) has a direct impact on the conductivity of the bond, as a larger diameter leads to more conductivity through the bond. The thickness of the primer 212a-b (Tp) also has an impact on the conductivity. Specifically, a greater thickness will lead to less pressure at the electrical bond 222, and therefore reduce the conductivity through the bond 222. The thickness of each of the outer layer 202 and inner layer 204 (Tol) (Til) impacts the conductivity, as thicker layers reduce flexing, thereby reducing pressure at the electrical bond 222 and further reducing conductivity. The force from fastener 200 clamping (Fcf) the two layers together also impacts the conductivity, as a higher clamping force will increase flexing of the layers 202, 204, further increasing conductivity at the bond 222. Lastly, the conductivity of the fastener 200 impacts the effectiveness of the electrical bond 222. The conductivity of the fastener 200 provides a parallel path, which can mask the relative conductivity of the electrical bond 222. Accordingly, those skilled in the art will create a specific electrical bond 222 based on the above variables, as well as other variables associated with a particular fuel tank.

In FIG. 6, a flowchart 60 depicts a method of diverting electrical current away from the fastener 200 as part of the fuel tank 20. At step 600, materials are selected to manufacture the fuel tank 20, including the outer layer 202, the inner layer 204, the fastener 200, and potential primers 212a-b. At step 602, the fuel tank 20 is manufactured with the layers 202, 204 secured together via the fastener 200 and the electrical bond 222 is created around the fastener 200. As discussed above, the electrical bond 222 may vary to accommodate one or more variables associated with the fuel tank 20. For example, the material and need for a fastener and diameter of the electrical bond 222 may be selected based on desired conductivity needed depending on a material of the fastener stem 224, a thickness of the each of the layers 202, 204, a force from the fastener 200 clamping, and a thickness of the primer 212a-b.

At step 604, the fuel tank 20 is exposed to lightning testing for certification and compliance with regulations. In other words, tests are conducted on the fuel tank 20, including at least applying a predetermined amplitude of current to the outer layer 214, wherein data is collected to determine the probability and potential for an ignition source. Such testing is extensive, and time consuming within the aircraft industry and merely simplified here.

At step 606, during testing, the electrical bond 222 provides a path for the applied current to travel that is separate from the fastener 200. Accordingly, the risk for a potential electric discharge at the inside end of the fastener 200 is reduced as the current is not condensed at the inside end of the fastener.

At step 608, once the fuel tank 20 is fully tested, has past testing, and then installed within an aircraft, the fuel tank 20 may continuously be exposed to the elements, resulting in a possibility of a lightning strike or conducting current from a lightning strike elsewhere on the aircraft. Should the fuel tank 20 be exposed to electrical current, the electrical bond 222 will again divert the current at least partially away from the fastener 200 to continue to reduce the risk for an electrical discharge inside of the fuel tank 20.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An aircraft fuel tank, comprising:
an inner layer having an inner surface and an outer surface;

an outer layer having an inner surface and an outer surface, the inner surface of the outer layer and the outer surface of the inner layer aligning at an interface;
a fastener extending through the inner layer and the outer layer to hold the inner layer and the outer layer together; and
an electrical bond separate from the fastener and adjacent to the fastener, the electrical bond conductively coupling the inner layer and the outer layer together, the electrical bond being selected from a group consisting of: (1) a spot face electrical bond at least partially surrounding a stem of the fastener; and (2) a washer positioned around the stem of the fastener;
wherein the electrical bond is configured to provide a pathway for an appreciable amount of electrical current to travel separate from the fastener.

2. The aircraft fuel tank of claim 1, wherein the electrical bond is extends outwardly from the stem.

3. The aircraft fuel tank of claim 2, wherein the electrical bond surrounds the stem of the fastener.

4. The aircraft fuel tank of claim 1, wherein the electrical bond extends through the interface between the inner layer and the outer layer.

5. The aircraft fuel tank of claim 1, wherein, when the electrical bond is the spot face electrical bond, the spot face electrical bond is a direct connection between the inner layer and the outer layer in a portion of the interface that lacks a primer such that the inner layer and the outer layer come into direct contact when force is applied via the fastener.

6. The aircraft fuel tank of claim 1, wherein, when the electrical bond is the washer, the washer is a metal ring separate the inner layer and the outer layer, the washer coming into contact with each of the inner layer and the outer layer once force is applied via the fastener to create the pathway between the outer layer and the inner layer.

7. The aircraft fuel tank of claim 1, further comprising a primer positioned along the outer surface of the inner layer and along the inner surface of the outer layer.

8. The aircraft fuel tank of claim 7, wherein the primer extends within the interface up to the electrical bond.

9. A method of diverting current away from a fastener in a aircraft fuel tank, the method comprising:
selecting an inner layer, an outer layer, and a fastener for the aircraft fuel tank;
connecting the inner layer and the outer layer with the fastener, the fastener extending from an outer surface of the outer layer to an inner surface of the inner layer;
creating an electrical bond between the inner layer and the outer layer that is separate from the fastener and adjacent to the fastener such that the inner layer and the outer layer are conductively coupled, the electrical bond being selected from a group consisting of: (1) a spot face electrical bond at least partially surrounding a stem of the fastener; and (2) a washer positioned around the stem of the fastener;
exposing the aircraft fuel tank to an electrical current;
wherein the electrical bond provides a pathway for the electrical current to travel that is separate from the fastener, thereby diverting at least a portion of the electrical current away from the fastener.

10. The method of claim 9, wherein the electrical bond extends outwardly from the stem.

11. The method of claim 9, wherein creating the electrical bond further comprises surrounding the stem of the fastener with the electrical bond.

12. The method of claim 9, wherein the electrical bond extends through an interface between the inner surface of the outer layer and the outer surface of the inner layer.

13. The method of claim 9, wherein, when the electrical bond is the spot face electrical bond, the spot face electrical bond is a direct connection between the inner layer and the outer layer in a portion of the interface that lacks a primer such that the inner layer and the outer layer come into direct contact when force is applied via the fastener.

14. The method of claim 9, wherein, when the electrical bond is the washer, the washer is a metal ring separate from the inner layer and the outer layer, the washer coming into contact with each of the inner layer and the outer layer once force is applied via the fastener to create the pathway between the outer layer and the inner layer.

15. The method of claim 9, further comprising adding a primer within the interface, the primer extending up to the electrical bond.

16. The method of claim 9, wherein at least a portion of the electrical current is a substantial amount of the electrical current.

17. The method of claim 9, further comprising determining a diameter and a material of the electrical bond based on a plurality of factors.

18. The method of claim 17, wherein the plurality of factors comprises a material of the fastener stem and a thickness of each of the inner layer and the outer layer.

19. The method of claim 18, wherein the plurality of factors further comprises a clamping force applied by the fastener and a thickness of a primer within the interface.

* * * * *